United States Patent [19]
Goldston

[11] Patent Number: 5,813,909
[45] Date of Patent: Sep. 29, 1998

[54] DEBONING MACHINE WITH SLOTTED SEPARATION CHAMBER

[75] Inventor: Thomas C. Goldston, South Lehi, Utah

[73] Assignee: Beehive, Inc., Sandy, Utah

[21] Appl. No.: 761,634

[22] Filed: Dec. 6, 1996

Related U.S. Application Data

[60] Provisional application No. 60/010,444 Jan. 23, 1996.

[51] Int. Cl.$^6$ .................................................. A22C 17/04
[52] U.S. Cl. ............................................................. 452/138
[58] Field of Search ............................................. 452/138

[56] References Cited

U.S. PATENT DOCUMENTS

| | | |
|---|---|---|
| Re. 33,752 | 11/1991 | Poss . |
| 4,025,001 | 5/1977 | Yarem et al. ............................. 452/138 |
| 4,189,104 | 2/1980 | dos Santos . |
| 4,638,954 | 1/1987 | Poss ........................................... 241/74 |
| 4,824,027 | 4/1989 | Shaw et al. ............................... 241/74 |
| 5,306,202 | 4/1994 | Meeker .................................... 452/138 |
| 5,580,305 | 12/1996 | McFarland .............................. 452/138 |

*Primary Examiner*—Willis Little
*Attorney, Agent, or Firm*—Andrus, Sceales, Starke & Sawall

[57] ABSTRACT

A slotted separation chamber for a compression type deboning machine comprises a plurality of elongated slots each formed of a pair of spaced apart side walls presenting interior side edges, and formed of a opposing arcuate end walls presenting interior arcuate end edges, the slots being oriented such that side edges lie at an angle relative to the central axis of the separation chamber so as to be tilted in the direction of rotation of an cooperating auger. The side and end edges cooperate with the fluted turns of the auger to shave or peel away the meat from the bone to produce a coarser and highly textured separated product.

7 Claims, 2 Drawing Sheets

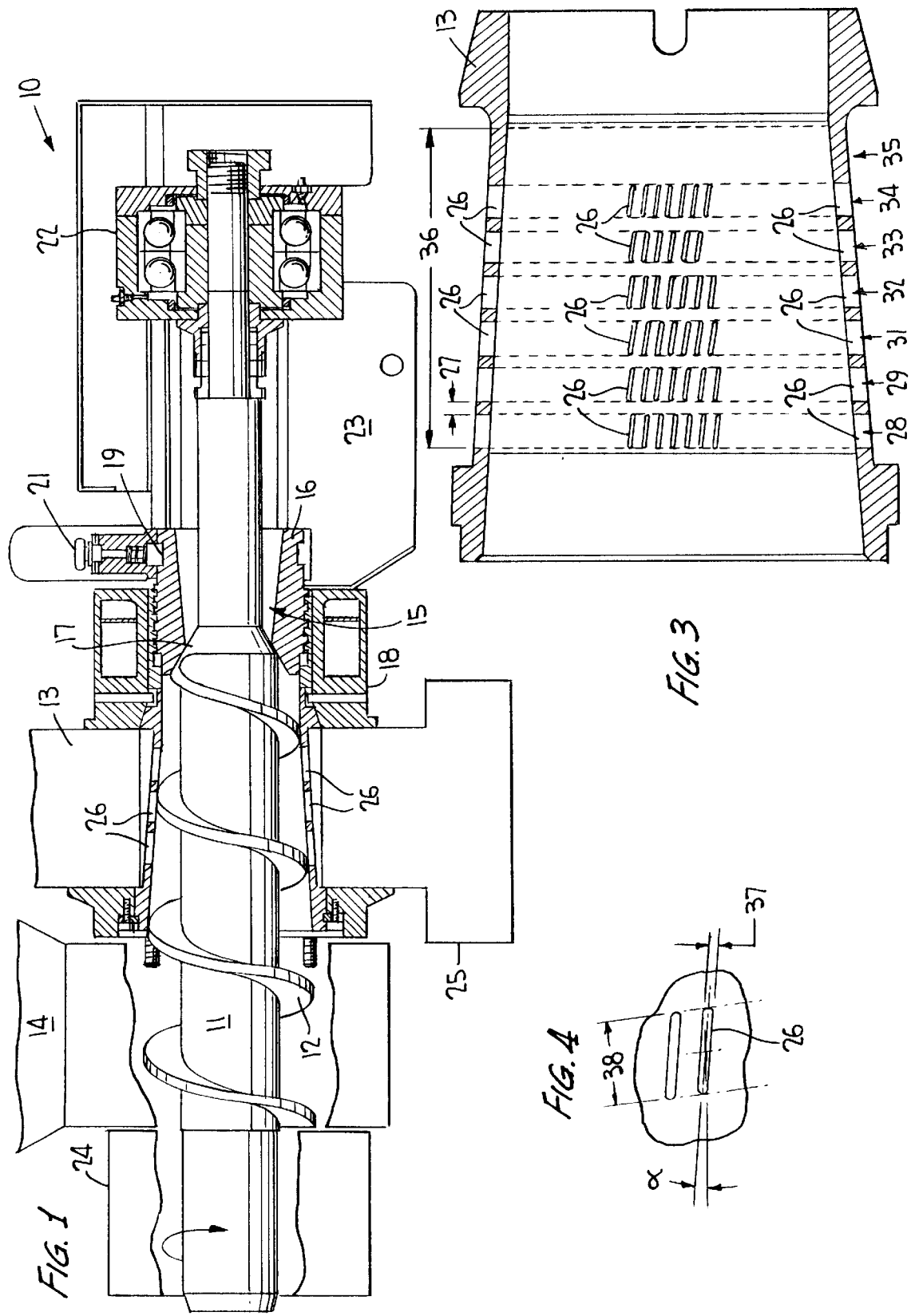

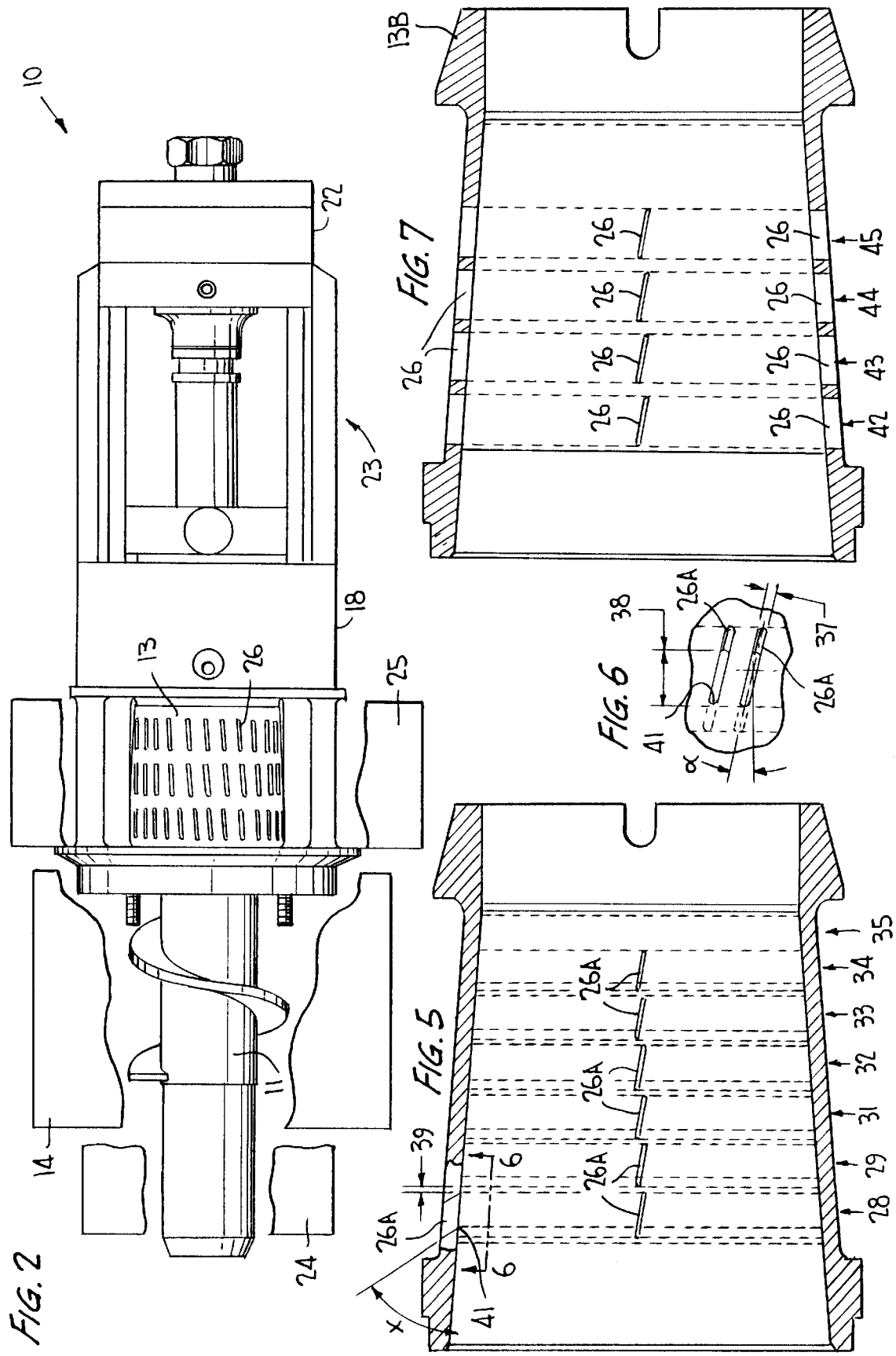

DEBONING MACHINE WITH SLOTTED SEPARATION CHAMBER

The U.S. Provisional Application No. 60/010,444 filed Jan. 23, 1996.

BACKGROUND OF THE INVENTION

This invention relates generally to a machine for deboning or separating meats, such as red meat, pork, poultry and fish from bone, cartilage or sinew. More particularly, the invention relates to such a machine having a perforated separation chamber with a plurality of elongated slots for improving the texture and quality of the recovered meats.

The prior art deboning machine of the type to which the invention is directed includes a compression type conveyor screw or auger operating in a perforated conduit, otherwise referred to as a separation chamber, to convey bone connected meat from the feed end of the machine to the bone discharge end. A valve ring surrounds the downstream end of the auger in a manner creating a back pressure to provide a choke for controlling pressure within the separation chamber, thereby controlling extrusion through the perforations of the chamber of the separated meat.

Such a prior art machine is disclosed in U.S. Pat. No. 4,189,104, commonly owned herewith. The auger and separation chamber taper in a forward direction, and the separation chamber is perforated by the provision of a plurality of round holes.

The separation chamber is typically of machined heavy duty steel for withstanding the high pressure during the deboning operation. The perforations extend between the inner and outer surfaces of the chamber wall, and present a plurality of sharp arcuate edges which, in cooperation with the fluted turns of the auger, function to strip the meat from its bone as the bone connected meat is moved progressively by the turns of the auger from the feed end to the bone discharge end. The separated meat, in finely chopped or almost puree form, is channeled by the perforations into a separate meat collector for use as meat fillers and for the making of sausages, luncheon meats, meat patties, and the like.

The finely ground or comminuted recovered meat product obtained using this prior art separation process, however, limits the end use of the separated product. There is presently a demand for a coarser and improved texture of meat recovered from bone and sinew for use as a primary meat source instead of a filler.

SUMMARY OF THE INVENTION

It is therefore an object of the present invention to provide a deboning machine which functions in a manner similar to that as aforedescribed except that the separation chamber has out-of-round perforations which, upon coacting with the helical turns of the auger, function to shave or peel away the meat from the bone or sinew thereby producing a coarser and highly textured separated product having a wider variety of end uses as compared to that offered by the prior art round hole separation chamber.

According to the present invention the perforations of the separation chamber comprise a plurality of elongated slots presenting a plurality of sharp arcuate as well as straight edges to the advancing bone connected meat so as to be sheared or peeled away from the bone in cooperation with the rotating turns of the auger. The slots provided according to the invention may lie at an angle relative to the central axis of the separation chamber so as to be tilted in the direction of auger rotation. The slots may lie in rows forming annular zones in tandem, with the slot width in one or more upstream zones being wider compared to the slot width of one or more rows in zones downstream. Such a gradation in slot width in the direction of the smaller end of the separation chamber from the larger end, provide a further choke for controlling pressure within the slotted separation chamber for controlling the advance of the separated meat through the slots.

Other objects, advantages and other features of the invention will become more apparent for the following detailed description of the invention when taken in conjunction with the accompanying drawings.

BRIEF DESCRIPTION OF THE DRAWINGS

FIG. 1 is a side elevational view, partly in section, of a deboning machine having a slotted separation chamber according to the invention;

FIG. 2 is a top plan view of the deboning machine of FIG. 1;

FIG. 3 is a vertical sectional view, at an enlarged scale, of the slotted separation chamber according to one embodiment of the invention;

FIG. 4 is an enlarged plan view of a typical pair of slots of the FIG. 3 separation chamber;

FIG. 5 is a view similar to FIG. 3 according to another embodiment to the invention;

FIG. 6 is a plan view, at an enlarged scale, of a typical pair of slots of FIG. 5 taken substantially along line 6—6 thereof; and FIG. 7 a view similar to FIG. 3 of yet another embodiment of the slotted separation chamber according to the invention.

DETAILED DESCRIPTION OF THE INVENTION

Turning now to the drawings wherein like reference characters refer to like and corresponding parts throughout the several views, the deboning machine, generally designated 10 in the FIGS. 1 and 2, has a compression type screw conveyor or auger 11 with a plurality of helical turns 12, the external dimension of which tapers conically from a large diameter to a smaller diameter in a forward direction (to the right in FIGS. 1 and 2). The auger operates in a separation chamber or perforated conduit 13 forming a truncated cone shaped to match the outer diameter of the auger turns.

A product such as unboned meat, meat with attached sinew, or the like, is loaded into hopper 14 and is advanced from this feed end of the machine by the rotating auger to bone discharge end 15 of the machine. A ring valve 16 surrounds a forward extension 17 of the auger and is adjustable relative thereto for controlling the size of the annular discharge orifice located between the confronting surfaces of ring valve 16 and forward extension 17.

The ring valve comprises an elongated sleeve threaded to a water-cooled valve housing 18 for adjustment along its central axis by the provision of a ratchet 19 having an operating handle 21. Movement of ring valve 16 along its axis adjusts the spacing between the confronting faces from an interface position constituting full choke to any desired size of annular discharge opening, as for the purpose and in the manner known in the art.

The downstream end of the auger is supported in a bearing assembly 22, and between that assembly and the ring valve is a collection area 23 at which the comminuted bone after meat separation is discharged and collected.

The auger is further supported in a bearing housing 24, and some type of receptacle 25 surrounds the separation chamber for collecting the separated meat product.

Separation chamber 13 is more clearly shown in FIG. 3 as having a plurality of mutually spaced apart elongated openings 26 in the form of slots lying in adjacent annular rows each being spaced apart a predetermined distance 27 in the direction of the central axis of the chamber. The mutually spaced annular rows of slots form zones 28, 29, 31, 32, 33 and 34 in FIG. 3, there being a blank zone 35 adjacent zone 34 at the downstream end of the separation chamber.

For a maximum slot pattern area having a length 36 of 4.90 inches, the slot width 37, as typically shown in FIG. 4, can range from 0.02 to 0.10 inches, and the slot length 38 can vary from 0.125 to 1.75 inches.

Each elongated slot comprises a pair of spaced apart side walls 46, and opposing arcuate end walls 47. The side walls and end walls respectively define inner elongated side edges 48 and arcuate end edges 49 presented to the turns of the auger. In the FIGS. 3 and 7 embodiments, end walls 47 lie perpendicular to the inner surface of the separation chamber.

For the separation chamber tested of the type shown in FIG. 3, the slot width in each of zones 28 and 29 was 0.05 inches, the slot width 37 in each of zones 31 and 32 was 0.04 inches, and the slot width 37 in each of zones 33 and 34 was 0.03 inches.

Moreover, each of the slots 26 in each of the zones is orientated to downwardly slope at an angle α (FIG. 4) relative to the central axis of the chamber in the direction of auger rotation shown by the curved arrow in FIG. 1. The downward slope of the slots in the direction of the bone discharge end 15 may be approximately 10°.

In operation, as the product to be deboned and/or separated from the bone or sinew is advanced by the turns of the rotating auger from the feed end toward bone discharge end 15, the back pressure or choke provided by ring valve 16 controls the pressure within separation chamber 13 to thus control the extrusion or advance of the deboned meat through slots 26. Edges 48 and 49 of slots 26 are presented to turns 12 of the auger provide shearing edges which, together with the auger turns, facilitate a shearing of the meat from the bone through the slots, while the comminuted bone advances in a downstream direction toward the bone discharge end 15 and passes through the annular opening between the confronting conical surfaces of forward extension 17 and ring valve 16. Movement of the ring valve along its axis adjusts the spacing between such confronting surfaces from an interface position constituting full choke to any desired size of annular discharge opening, similarly as in the prior art. The recovered meat product is collected in receptacle 25, and the bone components are collected at area 23.

The recovered meat product has been shown to exhibit less abuse compared to that obtained with prior art separators such that the recovered meat can be used as a primary meat source instead of as a filler. The orientation of slots 26 and the decreasing slot width from feed end to discharge end of the separation chamber, is selected according to the type of meat to be separated and the skeletal part to be processed.

The separated meat obtained with the deboning machine according to the invention is coarser and has improved texture. Large particle separation of about one inch by about 0.06 inch by about 1.5 inch has been observed using the slotted separation chamber of the invention.

The reduction in slot width in three stages from zone 28 to zone 34 function to increase the choke for increasing pressure within the separation chamber, and serve to increase the yield of the separated meat as the product advances from the feed end to the bone discharge end of the separation chamber.

Slotted separation chamber 13A, according to another embodiment of the invention shown in FIG. 5, has slots 26A mutually spaced apart in annular spaced apart zones 28 to 34. However, the opposing arcuate end walls 51 of the slots, rather than being perpendicular to the wall of the separation chamber in which the slots are formed as in FIG. 3, are each formed as having a reverse angle X to the direction of advancement of the product through the separation chamber. Angle X may be about 60° relative to the central axis of the separation chamber. Otherwise, the slanted orientation of slots 26A, such as at angle α which may be about 10°, and the length 38 of the slots, as shown in FIG. 6, are the same as that described with reference FIGS. 3 and 4. And, the width 37 of each of the slots 26A may vary between zones 28 and 34 similarly as described with reference to FIG. 3.

The spacing 39 between the annular rows of slots 26A in the annular zones 28 to 34, measured at the inner wall surface of separation chamber 13A, is shorter compared to spacing 27 between the rows of slots in separation chamber 13. This shorter spacing 39 allows for the same number of six annular rows of slots as in separation chamber 13, and walls 51 present a series of sharp inner arcuate edges 41. These sharp edges present cutting edges to the turns of the auger when rotating about its axis in the direction of the curved arrow of FIG. 1, such that the meat is actually peeled away from its bone leaving coarser, highly textured and longer pieces of recovered meat from the bone compared to that obtained using prior art deboning machines.

Separation chamber 13B of FIG. 7 is another embodiment according to the invention which is similar to that of separation chamber 13, except that the slot length is slightly longer compared to that of FIG. 3, and the slots lie in annular adjacent rows or zones 42, 43, 44 and 45 which zones are fewer in number compared to that of FIG. 3. Otherwise, the function and operation of the slotted separation chamber 13B is the same as that described with reference to FIG. 3. Separation chamber 13B is tailored to the type of product being deboned and the skeletal part being processed. The width of slots 26 in zones 42 and 43 may be about 0.06 inches, and the width of the slots in zones 44 and 45 may be about 0.05 inches.

The slotted separation chamber according to the invention can be used with existing deboning machines or can be adapted to new design equipment. The slots can range from about 0.02 inches to about 0.10 inches in width and about 0.125 inches to about 1.75 inches in length. The elongated side edges of the slots and the upstream arcuate end edges thereof, which arcuate edges are at arcuate end walls 47 formed at 90° to the chamber as in FIG. 3, or are at arcuate end walls 51 formed at approximately 30° to the inner surface of the chamber as in FIG. 5 [(edges 41)], are presented to the turns of the auger which advance the product from the feed end to the bone discharge end of the separation chamber and serve to shear or peel away the recoverable meat from the bone and from the sinew to yield a coarser texture of meat showing less abuse and useable as a primary meat source, separate and distinct from the paste-like product typically resulting from mechanical deboning equipment.

Obviously, many other modifications and variations of the present invention are made possible in the light of the above-teachings, without departing from the scope of the invention.

What is claimed is:

1. A compression type deboning machine having an auger rotatable in one direction with a perforated separation chamber for separating meat from bone by the cooperation of sharp edges of the separation chamber and fluted turns of the auger upon conveyance of bone connected meat from a feed end of the machine in a downstream direction toward a discharge end of the machine at which means are provided for creating a back pressure to provide a choke for controlling pressure within the separation chamber, the improvement wherein perforations of said separation chamber comprise a plurality of elongated slots each formed of a pair of spaced apart side walls presenting interior side edges, and opposing arcuate end walls presenting interior arcuate end edges, said slots being oriented such that said side edges lie at an angle relative to the central axis of said separation chamber so as to be tilted in said one direction of auger rotation, wherein at least one of the slot walls lies at a predetermined reverse angle to the inner surface of said chamber, said side edges and said end edges cooperating with the fluted turns of the auger to shave or peel away the meat from the bone to produce a coarser and highly textured separated product.

2. The machine according to claim 1, wherein said slots lie in a plurality of annular rows respectively spaced apart a predetermined distance along a central axis of said auger.

3. The machine according to claim 1, wherein said angle is about 30°.

4. A compression type deboning machine having an auger rotatable in one direction with a perforated separation chamber for separating meat from bone by the cooperation of sharp edges of the separation chamber and fluted turns of the auger upon conveyance of bone connected meat from a feed end of the machine in a downstream direction toward a discharge end of the machine at which means are provided for creating a back pressure to provide a choke for controlling pressure within the separation chamber, the improvement wherein perforations of said separation chamber comprise a plurality of elongated slots each formed of a pair of spaced apart side walls presenting interior side edges, and opposing arcuate end walls presenting interior arcuate end edges, said slots being oriented such that said side edges lie at an angle relative to the central axis of said separation chamber so as to be tilted in said one direction of auger rotation, said side edges and said end edges cooperating with the fluted turns of the auger to shave or peel away the meat from the bone to produce a coarser and highly textured separated product, wherein said slots lie in a plurality of annular rows respectively spaced apart a predetermined distance along a central axis of said auger, and wherein said slots in said rows, respectively, each have a slot width decreasing in size from said upstream to said downstream ends to thereby provide a further choke for controlling pressure within said chamber.

5. A compression type deboning machine having an auger rotatable in one direction with a perforated separation chamber for separating meat from bone by the cooperation of sharp edges of the separation chamber and fluted turns of the auger upon conveyance of bone connected meat from a feed end of the machine in a downstream direction toward a discharge end of the machine at which means are provided for creating a back pressure to provide a choke for controlling pressure within the separation chamber, the improvement wherein perforations of said separation chamber comprise a plurality of elongated slots each formed of a pair of spaced apart side walls presenting interior side edges, and opposing arcuate end walls presenting interior arcuate end edges, said slots being oriented such that said side edges lie at an angle relative to the central axis of said separation chamber so as to be tilted in said one direction of auger rotation, wherein an opposed pair of the slot walls lie at a predetermined reverse angle to the inner surface of said chamber, said side edges and said end edges cooperating with the fluted turns of the auger to shave or peel away the meat from the bone to produce a coarser and highly textured separated product.

6. A compression type deboning machine having an auger rotatable in one direction with a perforated separation chamber for separating meat from bone by the cooperation of sharp edges of the separation chamber and fluted turns of the auger upon conveyance of bone connected meat from a feed end of the machine in a downstream direction toward a discharge end of the machine at which means are provided for creating a back pressure to provide a choke for controlling pressure within the separation chamber, the improvement wherein perforations of said separation chamber comprise a plurality of elongated slots each formed of a pair of spaced apart side walls presenting interior side edges, and opposing arcuate end walls presenting interior arcuate end edges, said slots being oriented such that said side edges lie at an angle relative to the central axis of said separation chamber so as to be tilted in said one direction of auger rotation, wherein said arcaute end walls of said slots lie at a predetermined reverse angle to the inner surface of said chamber, said side edges and said end edges cooperating with the fluted turns of the auger to shave or peel away the meat from the bone to produce a coarser and highly textured separated product.

7. A compression type deboning machine having an auger rotatable in one direction with a perforated separation chamber for separating meat from bone by the cooperation of sharp edges of the separation chamber and fluted turns of the auger upon conveyance of bone connected meat from a feed end of the machine in a downstream direction toward a discharge end of the machine at which means are provided for creating a back pressure to provide a choke for controlling pressure within the separation chamber, the improvement wherein perforations of said separation chamber comprise a plurality of elongated slots each formed of a pair of spaced apart side walls presenting interior side edges, and opposing arcuate end walls presenting interior arcuate end edges, said slots being oriented such that said side edges lie at an angle relative to the central axis of said separation chamber so as to be tilted in said one direction of auger rotation, said side edges and said end edges cooperating with the fluted turns of the auger to shave or peel away the meat from the bone to produce a coarser and highly textured separated product, wherein said slots lie in a plurality of annular rows respectively spaced apart a predetermined distance along a central axis of said auger, and wherein said slots in one of said rows at an upstream end of said chamber each have a width greater than a width of said slots in one of the rows at a downstream end of said chamber to thereby provide a further choke for controlling pressure within said chamber.

\* \* \* \* \*